US008205407B2

(12) United States Patent
Genova

(10) Patent No.: US 8,205,407 B2
(45) Date of Patent: Jun. 26, 2012

(54) MODULAR DECKING SYSTEM

(76) Inventor: Michael C. Genova, Spokane, WA (US)

( * ) Notice: Subject to any disclaimer, the term of this patent is extended or adjusted under 35 U.S.C. 154(b) by 262 days.

(21) Appl. No.: 12/386,259

(22) Filed: Apr. 15, 2009

(65) Prior Publication Data

US 2010/0263317 A1  Oct. 21, 2010

(51) Int. Cl.
*E04B 2/00* (2006.01)

(52) U.S. Cl. ............ 52/582.1; 52/582.2; 52/585.1; 52/586.1; 403/335

(58) Field of Classification Search .......... 52/177, 52/592.1, 582.1, 582.2, 585.1, 586.1, 586.2, 52/592.4, 592.2; 403/335, 338, 353
See application file for complete search history.

(56) References Cited

U.S. PATENT DOCUMENTS

| | | | | |
|---|---|---|---|---|
| 968,512 | A * | 8/1910 | Praray | 52/506.09 |
| 2,158,732 | A * | 5/1939 | Shannon | 52/461 |
| 2,257,001 | A * | 9/1941 | Davis | 52/601 |
| 2,282,559 | A * | 5/1942 | Byers | 52/582.1 |
| 3,276,797 | A * | 10/1966 | Humes, Jr. | 52/715 |
| 3,296,764 | A * | 1/1967 | Tremblay | 52/584.1 |
| 3,374,703 | A * | 3/1968 | Davis et al. | 411/466 |
| 3,416,275 | A * | 12/1968 | Van Loghem et al. | 52/282.3 |
| 4,142,342 | A * | 3/1979 | Jungers et al. | 52/586.2 |
| 4,435,935 | A * | 3/1984 | Larrea | 52/461 |
| 4,468,910 | A * | 9/1984 | Morrison | 52/591.2 |
| 4,571,910 | A * | 2/1986 | Cosentino | 52/391 |
| 4,599,841 | A * | 7/1986 | Haid | 52/396.04 |
| 4,703,603 | A * | 11/1987 | Hills | 52/582.1 |
| 4,777,777 | A * | 10/1988 | Massimo | 52/586.2 |
| 4,848,058 | A * | 7/1989 | Mullen | 52/583.1 |
| 5,054,256 | A * | 10/1991 | Glover et al. | 52/765 |
| 5,078,530 | A * | 1/1992 | Kim | 403/24 |
| 5,103,613 | A * | 4/1992 | Kinoshita | 52/292 |
| 5,157,804 | A * | 10/1992 | Williams | 15/161 |
| 5,251,996 | A * | 10/1993 | Hiller et al. | 403/331 |
| 5,272,850 | A * | 12/1993 | Mysliwiec et al. | 52/582.2 |
| 5,305,567 | A * | 4/1994 | Wittler | 52/238.1 |
| 5,509,244 | A * | 4/1996 | Bentzon | 52/387 |
| 5,609,435 | A * | 3/1997 | Nomura | 403/387 |
| 5,694,730 | A * | 12/1997 | Del Rincon et al. | 52/586.1 |
| 5,713,175 | A * | 2/1998 | Mitchell | 52/582.1 |
| 6,189,283 | B1 * | 2/2001 | Bentley et al. | 52/587.1 |
| 6,233,886 | B1 * | 5/2001 | Andres | 52/177 |
| 6,339,908 | B1 * | 1/2002 | Chuang | 52/589.1 |
| 6,363,677 | B1 * | 4/2002 | Chen et al. | 52/586.1 |
| 6,427,408 | B1 * | 8/2002 | Krieger | 52/489.1 |
| 6,446,413 | B1 * | 9/2002 | Gruber | 52/747.11 |
| 6,453,632 | B1 * | 9/2002 | Huang | 52/403.1 |
| 6,484,467 | B2 * | 11/2002 | Crout | 52/483.1 |
| 6,651,400 | B1 * | 11/2003 | Murphy | 52/586.2 |
| 6,662,508 | B1 * | 12/2003 | Else | 52/177 |
| 6,711,864 | B2 * | 3/2004 | Erwin | 52/582.1 |
| 6,763,643 | B1 * | 7/2004 | Mårtensson | 52/586.1 |
| 6,769,217 | B2 * | 8/2004 | Nelson | 52/582.1 |
| 6,918,215 | B2 * | 7/2005 | Smith | 52/177 |

(Continued)

*Primary Examiner* — Brian Glessner
*Assistant Examiner* — Joshua Ihezie
(74) *Attorney, Agent, or Firm* — Paine Hamblen, LLP

(57) ABSTRACT

An apparatus forming a assembly includes at least two panels. Each panel has a top surface and a plurality of perimetric edges. Each edge of one panel is adapted for joining any edge of another panel or to rounded edge pieces that connect is a complementary manner to the panels similar to other panels. The apparatus includes at least one connector adapted to secure two panels in adjoined relation. The connector has a first end adapted for engagement with the two adjoined panels, and a second end adapted to be swung into a locked position.

16 Claims, 10 Drawing Sheets

U.S. PATENT DOCUMENTS

| | | | |
|---|---|---|---|
| 6,920,732 B2* | 7/2005 | Mårtensson | 52/586.1 |
| 6,966,155 B2* | 11/2005 | Nevison | 52/177 |
| 7,021,009 B2* | 4/2006 | Johnson | 52/79.5 |
| 7,021,019 B2* | 4/2006 | Knauseder | 52/588.1 |
| 7,108,902 B2* | 9/2006 | Ellingson | 428/54 |
| 7,207,147 B2* | 4/2007 | Price et al. | 52/586.1 |
| 7,418,805 B2* | 9/2008 | Tan | 52/582.2 |
| 7,607,265 B2* | 10/2009 | Curry et al. | 52/181 |
| 7,621,091 B2* | 11/2009 | Dickey et al. | 52/582.2 |
| 7,665,264 B1* | 2/2010 | Wolfe | 52/586.2 |
| 7,690,160 B2* | 4/2010 | Moller, Jr. | 52/177 |
| 7,698,859 B2* | 4/2010 | Sansano Marti | 52/177 |
| 7,726,088 B2* | 6/2010 | Muehlebach | 52/582.1 |
| 7,774,991 B2* | 8/2010 | Fletcher et al. | 52/71 |
| 7,861,482 B2* | 1/2011 | Pervan et al. | 52/586.1 |
| 7,866,110 B2* | 1/2011 | Pervan | 52/586.2 |
| 2002/0108323 A1* | 8/2002 | Gruber | 52/177 |
| 2002/0139070 A1* | 10/2002 | Berndt, Jr. | 52/177 |
| 2002/0170259 A1* | 11/2002 | Ferris | 52/596 |
| 2002/0189190 A1* | 12/2002 | Charmat et al. | 52/586.2 |
| 2003/0074855 A1* | 4/2003 | Nelson | 52/586.2 |
| 2004/0016197 A1* | 1/2004 | Ruhdorfer | 52/578 |
| 2004/0060255 A1* | 4/2004 | Knauseder | 52/582.2 |
| 2004/0083675 A1* | 5/2004 | Grimes | 52/586.2 |
| 2006/0016136 A1* | 1/2006 | Moller, Jr. | 52/177 |
| 2006/0174577 A1* | 8/2006 | O'Neil | 52/586.2 |
| 2007/0028547 A1* | 2/2007 | Grafenauer et al. | 52/586.1 |
| 2007/0113492 A1* | 5/2007 | Dickey et al. | 52/177 |
| 2007/0240375 A1* | 10/2007 | Bennett et al. | 52/586.1 |
| 2008/0302044 A1* | 12/2008 | Johansson | 52/403.1 |
| 2009/0151290 A1* | 6/2009 | Liu | 52/586.1 |
| 2009/0205269 A1* | 8/2009 | Dolinski | 52/173.1 |
| 2009/0249730 A1* | 10/2009 | Vibiano | 52/586.2 |
| 2010/0251640 A1* | 10/2010 | Franchini | 52/177 |
| 2011/0047922 A1* | 3/2011 | Fleming, III | 52/582.1 |

* cited by examiner

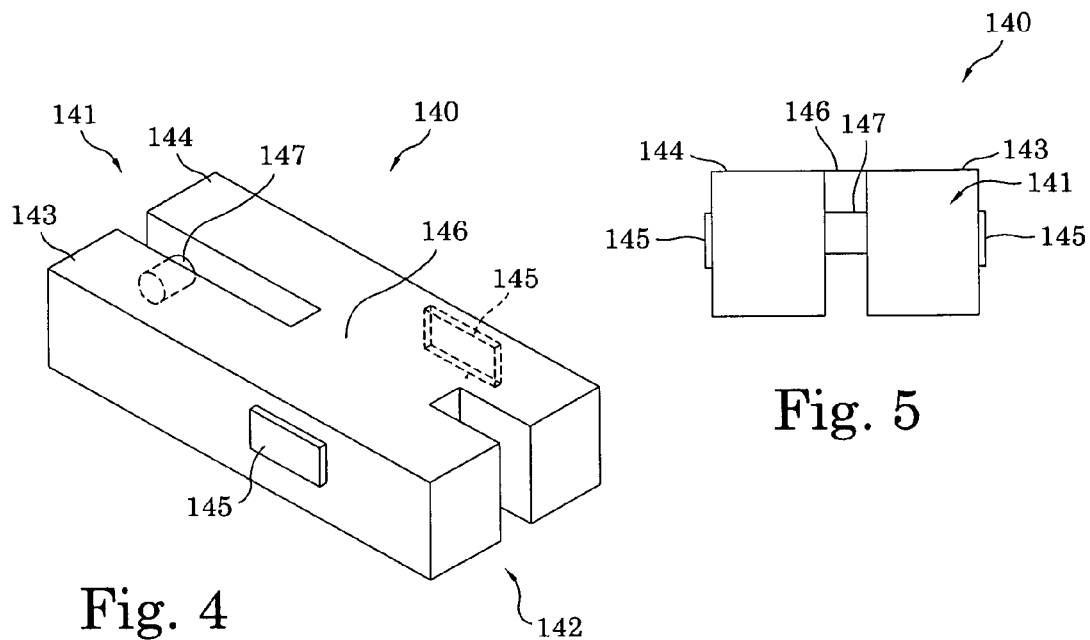
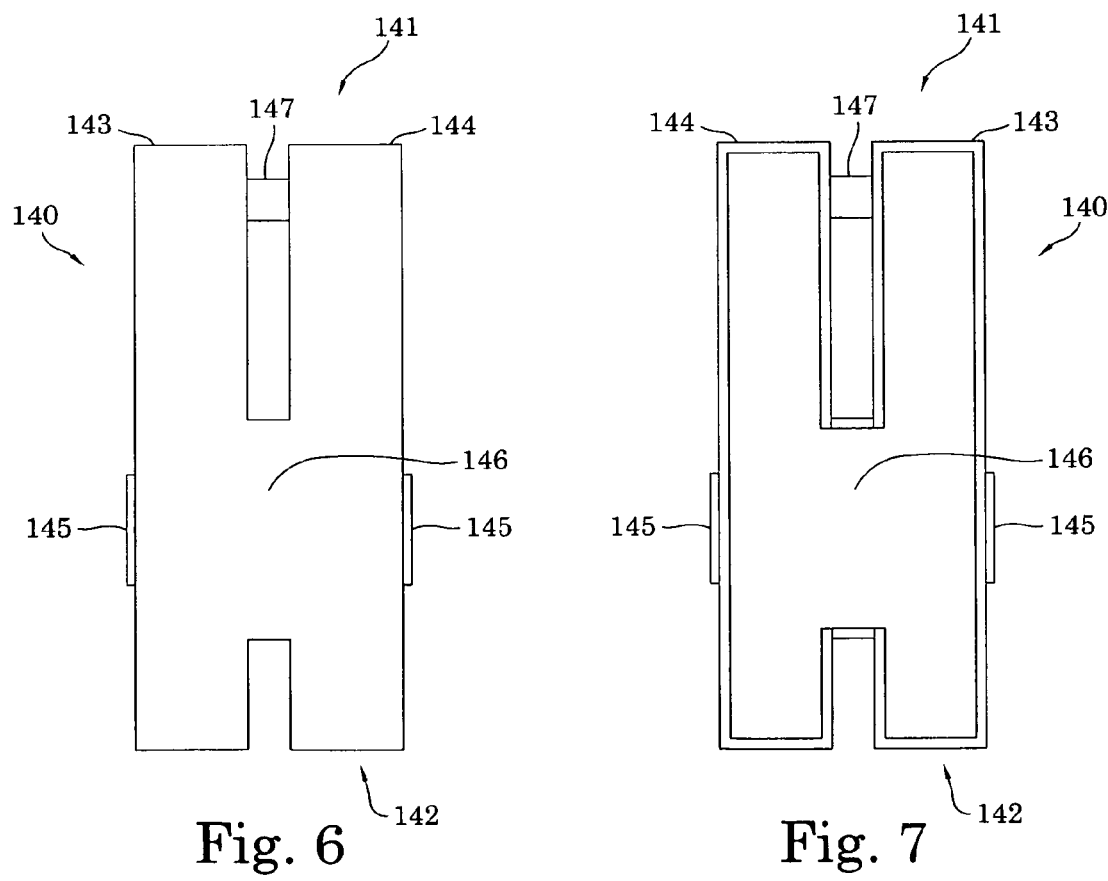

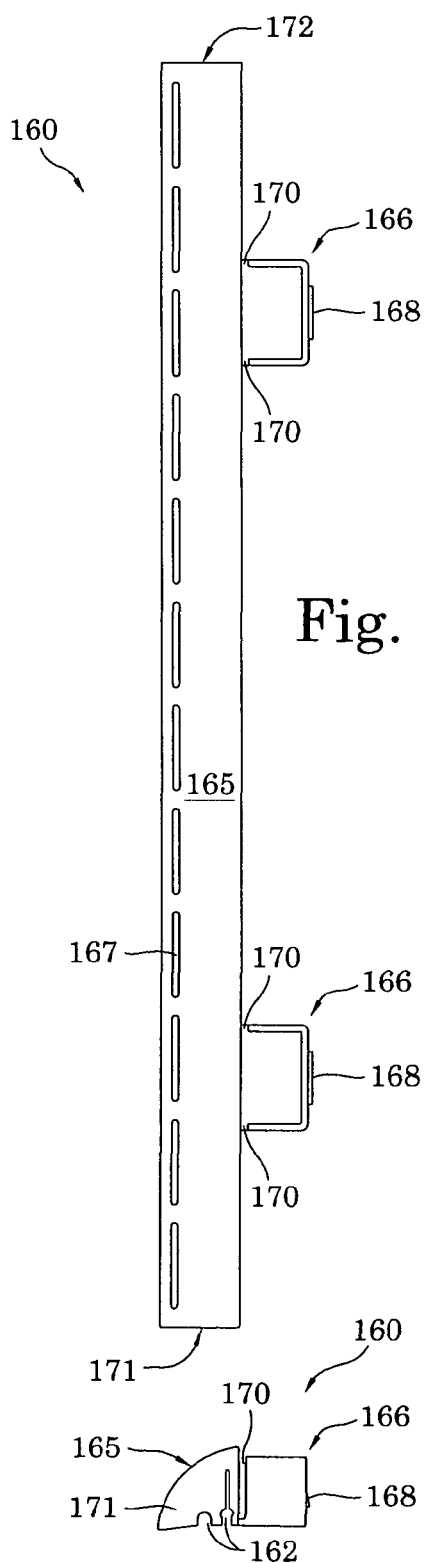
Fig. 10
Fig. 12
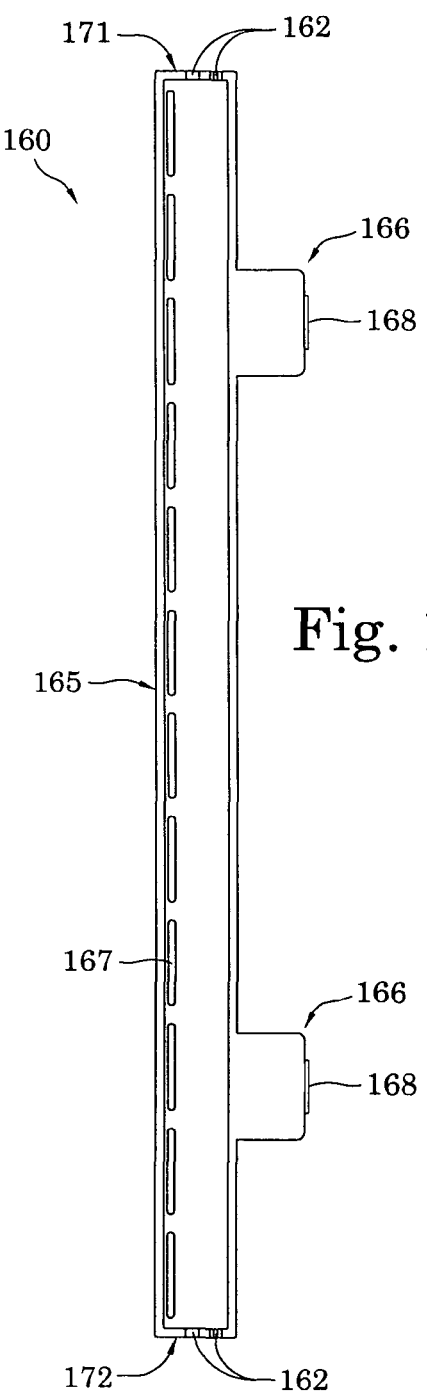
Fig. 11

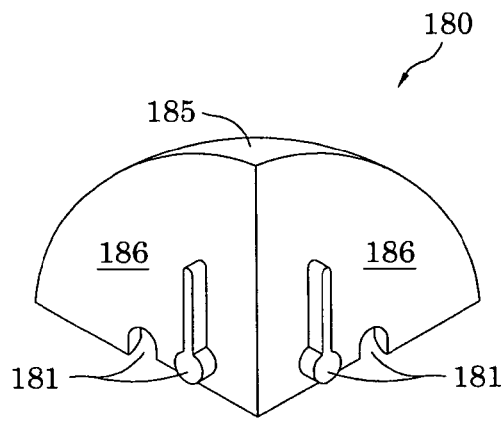
Fig. 13
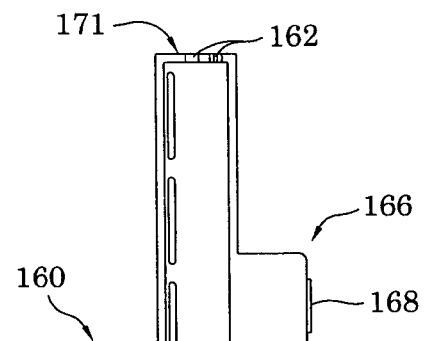
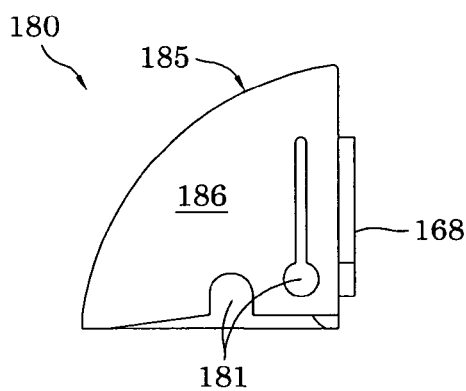
Fig. 15
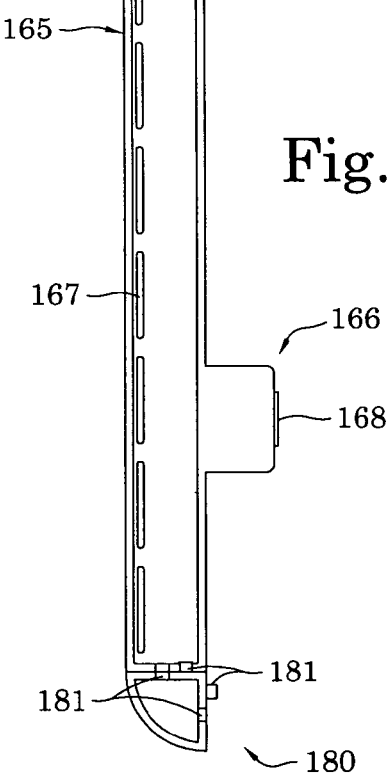
Fig. 14

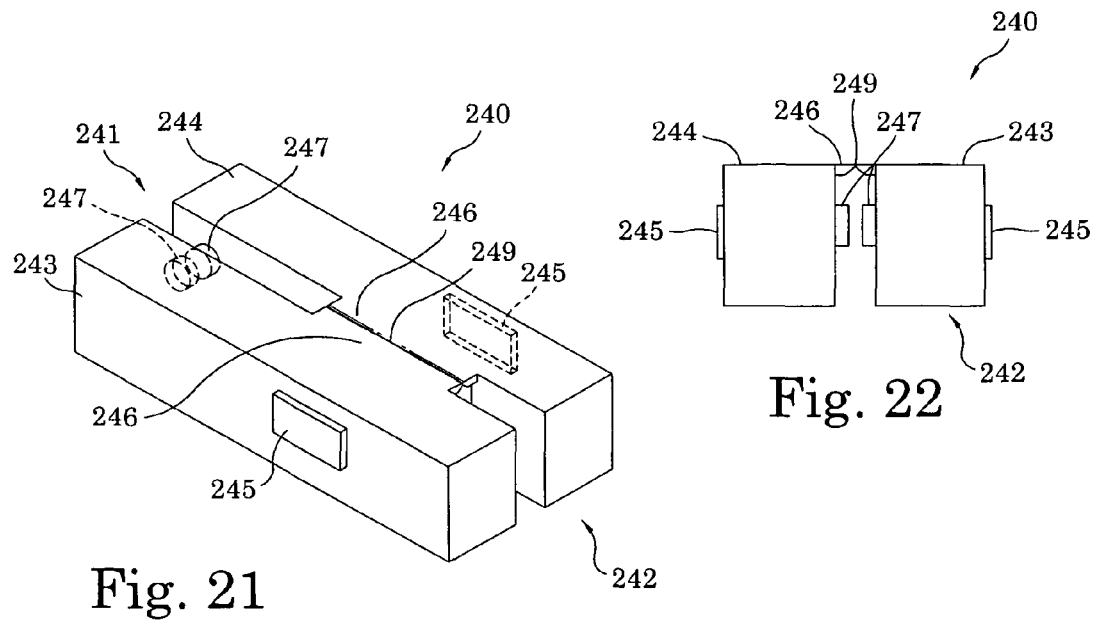
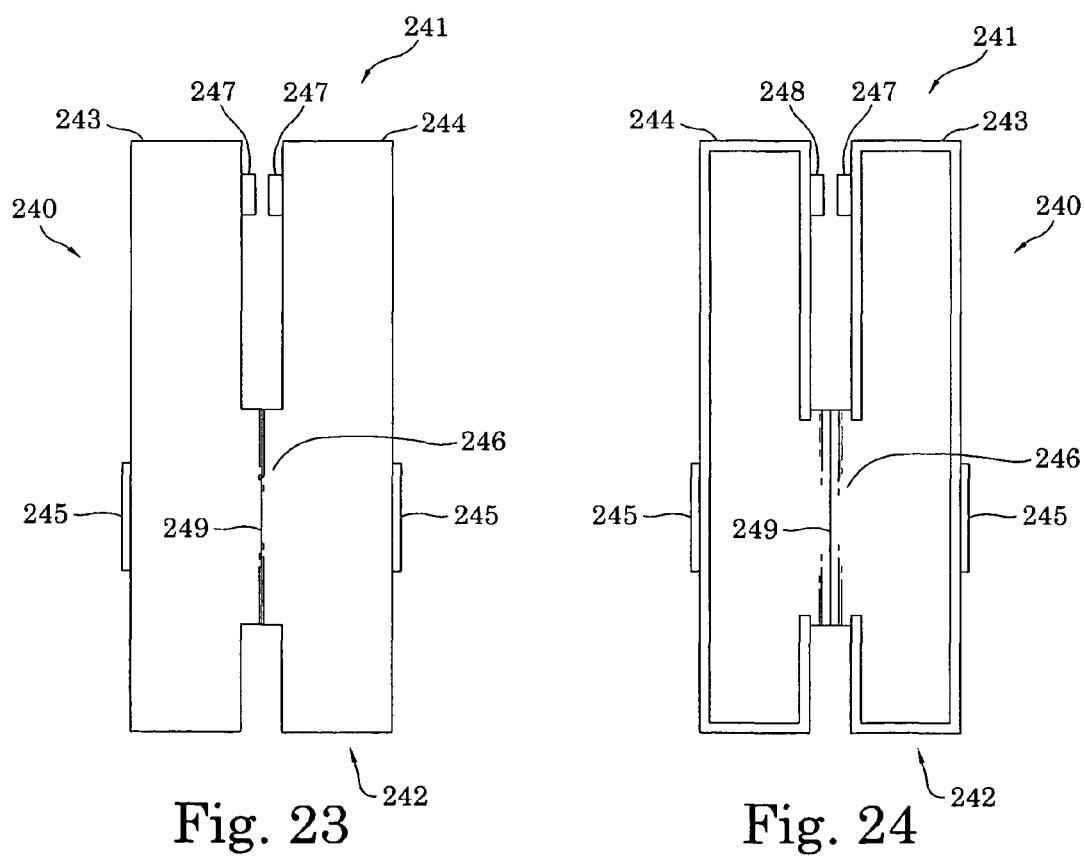

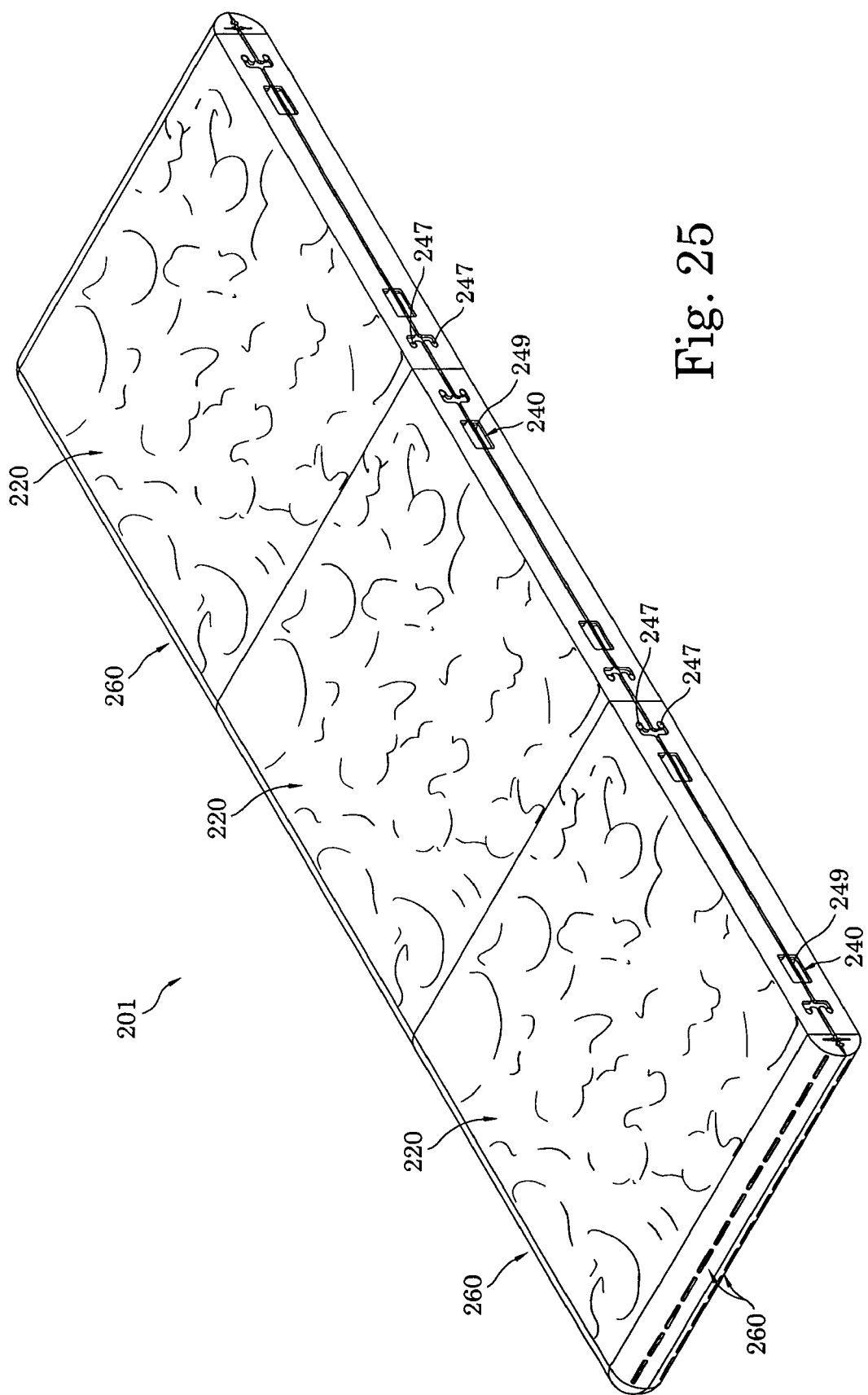

MODULAR DECKING SYSTEM

BACKGROUND OF THE INVENTION

There is a need for modular decking systems which are portable and may be used for various periods of time depending on the user's desires. Such systems can be used for walkways, servicing motorcycles, cars, and other vehicles either in remote locations or on yards, etc.

There are other uses where a firm surface is desired despite a relatively soft or otherwise undesirable surface for whatever activity might be considered. This may be of particular utility when used over potentially soft or muddy soils, or when weather has rendered the soil unsuitable to work on.

Some currently available modular decking systems are tedious to assemble. Interconnections may be numerous and thus time consuming to assemble and disassemble. The ability to provide connections which accommodate underlaying surface irregularities is also a challenge modular decking suitable for use on various surfaces must consider. Most systems have difficulty with such angular variations.

Some systems require total disassembly when changed from an assembled condition to portable condition. This involves more work and relatively longer times to both assemble and disassemble. There exists a continuing need for improved modular decking systems that address these or other considerations which may be pertinent given the variety of uses to which modular decking may be placed in use.

Some or all of the problems explained above and other problems may be helped or solved by the inventions shown and described herein. Such inventions may also be used to address other problems not set out above or which are only understood or appreciated at a later time. The future may also bring to light currently unknown or unrecognized benefits which may be appreciated or more fully appreciated in association with the inventions shown and described herein. The explanations given above do not act as an admission that such recognition or discovery of the problems and associated benefits are in fact prior art.

DESCRIPTION OF THE DRAWING FIGURES

Preferred forms, configurations, embodiments and/or diagrams relating to and helping to describe preferred aspects and versions of the inventions are explained and characterized herein, often with reference to the accompanying drawings. The drawings and all features shown therein also serve as part of the disclosure of the inventions of the current document, whether described in text or merely by graphical disclosure alone. Such drawings are briefly described below.

FIG. 4 is a perspective view of a connector shown in isolation.

FIG. 5 is an end view of the connector shown in FIG. 4.

FIG. 6 is a top view of the connector shown in FIG. 4.

FIG. 7 is a bottom view of the connector shown in FIG. 4.

FIG. 10 is a top view of the edge piece shown in FIG. 8.

FIG. 11 is a bottom view of the edge piece shown in FIG. 8.

FIG. 12 is an end view of the edge piece shown in FIG. 8.

FIG. 13 is a perspective view of a corner piece shown in isolation.

FIG. 14 is a bottom view of the edge piece shown in FIG. 8, and of the corner piece shown in FIG. 13, connected together.

FIG. 15 is a side view of the corner piece shown in FIG. 13.

FIG. 21 is a perspective view of an alternative connector which is foldable in isolation according to another preferred alternative of the inventions.

FIG. 22 is an end view of the connector shown in FIG. 21.

FIG. 23 is a top view of the connector shown in FIG. 21.

FIG. 24 is a bottom view of the connector shown in FIG. 21.

FIG. 25 is a perspective view of a folded assembly apparatus in accordance with an alternative embodiment of the inventions.

| DESCRIPTION IN ADDED DETAIL Table of Description Subsections |
| --- |
| Introductory Notes |
| General Overview of Apparatus |
| Panel or Panels |
|     Panel Top |
|     Panel Bottom Construction |
|     Preferred Panel Edge Construction |
|     Panel Connection Features |
|     Panel Construction and Materials |
| Edge Pieces |
| Corner Pieces |
| First Embodiment |
|     First Connector for Joining Panels |
| Lock Mechanisms |
| Second Embodiment |
|     Connector for Flexibly Joining Panels |
| Methods of Assembly |
| Manners of Using First Embodiment |
| Manners of Using Second Embodiment |
| Manners of Making |
| Interpretation Notes |

INTRODUCTORY NOTES

The readers of this document should understand that the embodiments described herein may rely on terminology used in any section of this document and other terms readily apparent from the drawings and the language common therefor as may be known in a particular art and such as known or indicated and provided by dictionaries. Dictionaries were used in the preparation of this document. Widely known and used in the preparation hereof are Webster's Third New International Dictionary (© 1993), The Oxford English Dictionary (Second Edition, © 1989), and The New Century Dictionary (© 2001-2005), all of which are hereby incorporated by reference for interpretation of terms used herein and for application and use of words defined in such references to more adequately or aptly describe various features, aspects and concepts shown or otherwise described or shown herein using more appropriate words having meanings applicable to such features, aspects and concepts.

This document is premised upon using one or more terms with one embodiment that may also apply to other embodiments for similar structures, functions, features and aspects of the inventions. Wording used in the claims is also descriptive of the inventions, and the text of both claims and abstract are incorporated by reference into the description entirely in the form as originally filed. Terminology used with one, some or all embodiments may be used for describing and defining the technology and exclusive rights associated herewith.

The readers of this document should further understand that the embodiments described herein may rely on terminology and features suitably used in any section or embodiment shown in this document and other terms readily apparent from the drawings and language common or proper therefor. This document is premised upon using one or more terms or features shown in one embodiment that may also apply to or be combined with other embodiments for similar structures, functions, features and aspects of the inventions and provide additional embodiments of the inventions.

General Overview of Apparatus

Figure 1:
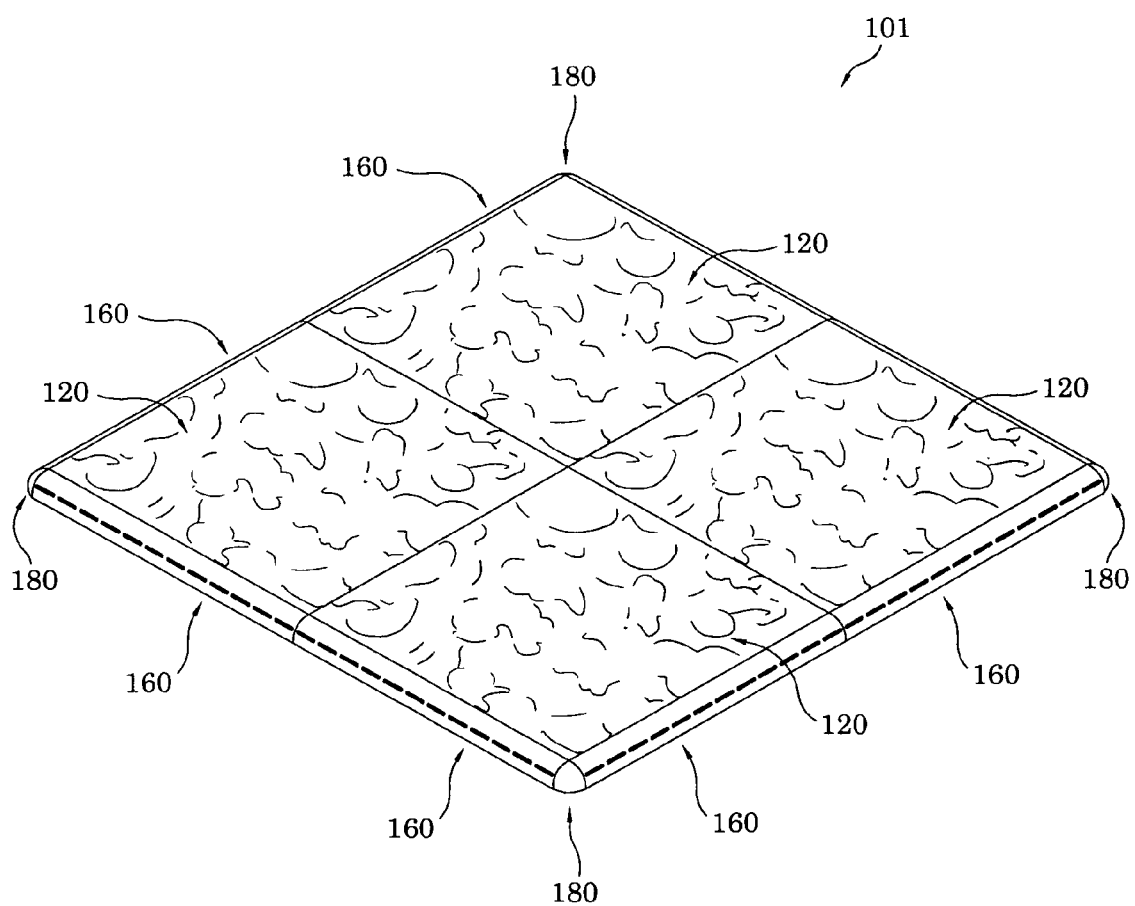
FIG. 1 is a perspective view of an assembly according to one preferred embodiment of the inventions.

To facilitate an understanding of the inventions, a general overview of an apparatus in accordance with a preferred embodiment of the inventions is first provided. With reference to FIG. 1, an upper perspective view of a modular decking assembly apparatus 101 is shown. The apparatus may include a plurality of modular panels 120. The modular panels are configured to be joined together to produce a decking surface having a desired size and shape depending on the number or shape and size of the panels used. The assembled apparatus is configured to be supported on a substrate (not shown) such as ground, lawn, pavement, or other various other supporting types of surfaces.

Still referring to FIG. 1, the apparatus may also include a plurality of edge pieces 160. The edge pieces are configured to be connected to the periphery of one or more panels 120. In a preferred embodiment of the inventions, a plurality of edge pieces 160 is connected to the periphery of a plurality of assembled panels 120, as shown. The edge pieces may be configured to provide a smooth transition between the panels and a supporting surface (not shown) upon which the panels are placed or otherwise supported. As shown, in accordance with at least one preferred embodiment of the inventions, the edge pieces 160 are substantially rounded.

The apparatus may also include a plurality of corner pieces 180. In a preferred embodiment of the inventions, the corner pieces are configured to be connected between two adjacent edge pieces 160 at a corner of a panel or array of panels. The corner pieces are advantageously configured to provide a substantially smooth transition between two adjacent edge pieces and the panel at a corner to provide reduced risk of tripping and a visually complete surround to a panel or assembly containing numerous panels.

The modular decking apparatus further includes a connector 140 which is shown in isolation in FIGS. 4-7. Further the connector is show as used in the assembly of the modular arrays in FIGS. 16-18. Connector 140 is configured to secure at least two panels 120 in adjoining relationship. In the preferred embodiment shown, there are two such connectors employed along each edge of adjoining panels to secure each panel to the adjoining panel. As shown, connector 140 is a discrete and separate component of the apparatus, although other configurations and constructions may be operable in some forms of the inventions. More specifically, the connector is preferably completely removable from the panels 120. This may be helpful for several reasons, such as to make each panel a flat piece which can be closely spaced for packaging, shipping or other transport or for other reasons.

Figure 19:
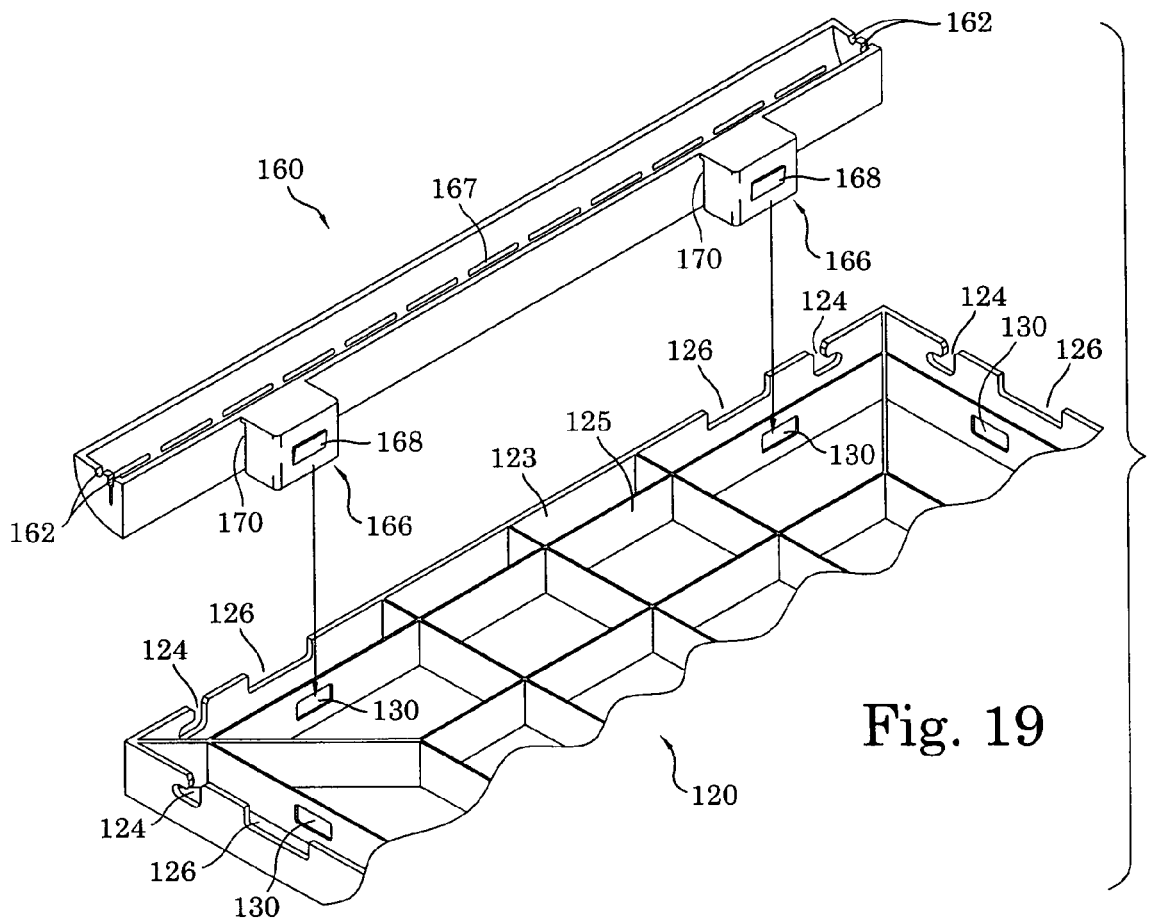
FIG. 19 is an exploded perspective detail view of an upside-down panel and an upside-down edge piece that is not engaged with the panel.
Figure 20:
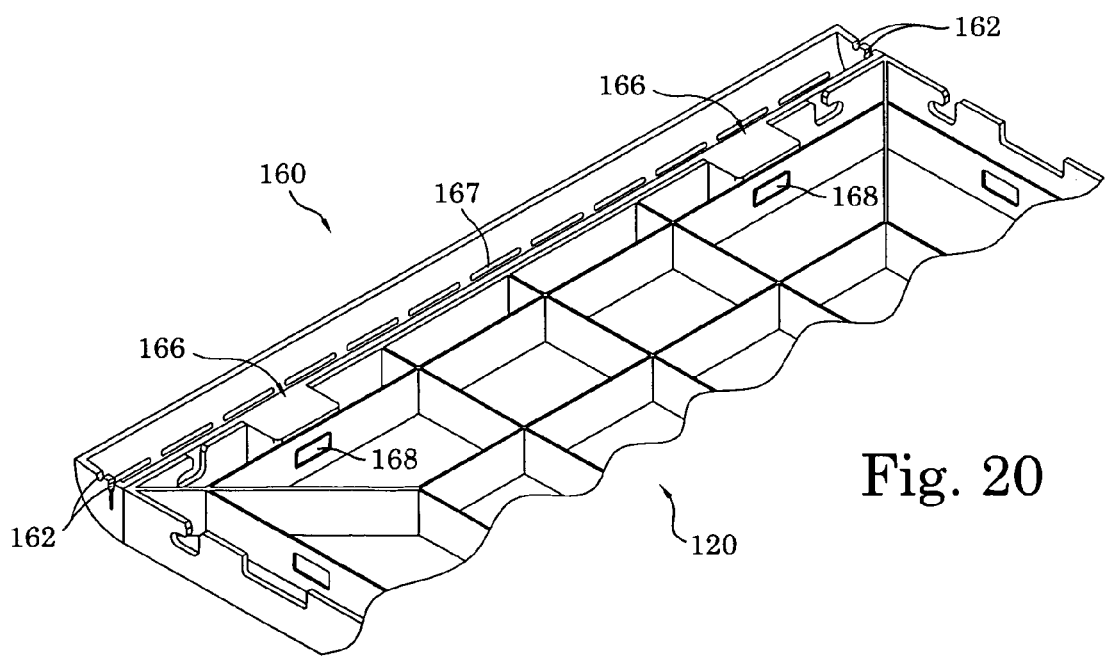
FIG. 20 is a perspective detail view of an upside-down panel and an upside-down edge piece that is fully engaged with the panel.

With reference to FIGS. 14, 19 and 20, the edge pieces 160 and the corner pieces 180 may be secured in adjoining relationship when assembled. In other versions of the inventions connection and securement may be accomplished in alternative manners. The means described more fully herein are preferably employed for connection and/or securement of the edge pieces and the corner pieces.

Figure 16:
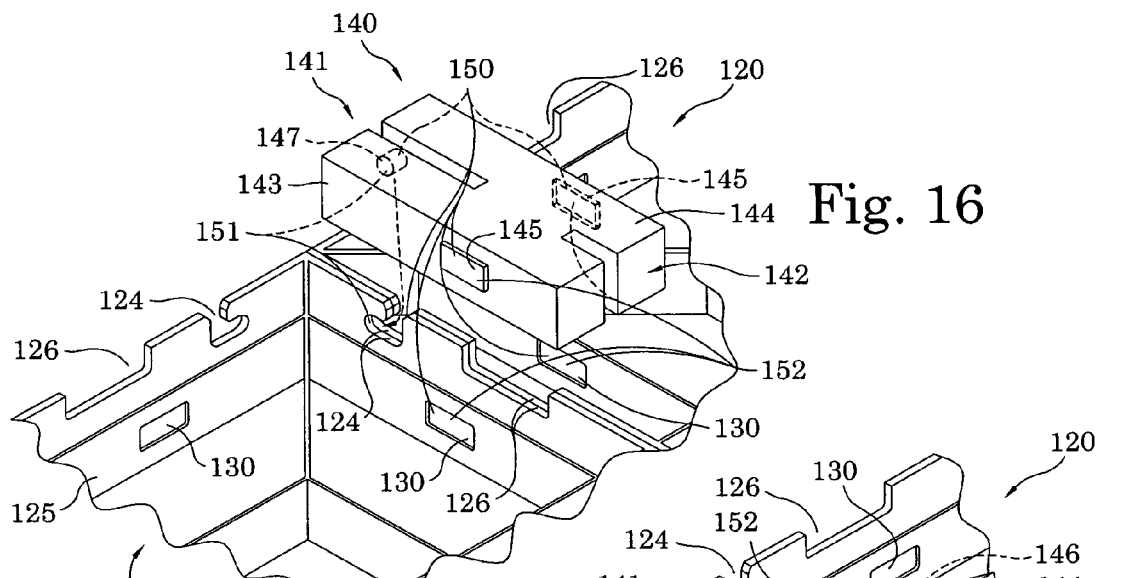
FIG. 16 is perspective detail view of two adjacent upside-down panels and a connector that is in superposition but not engaged with the panels.
Figure 17:
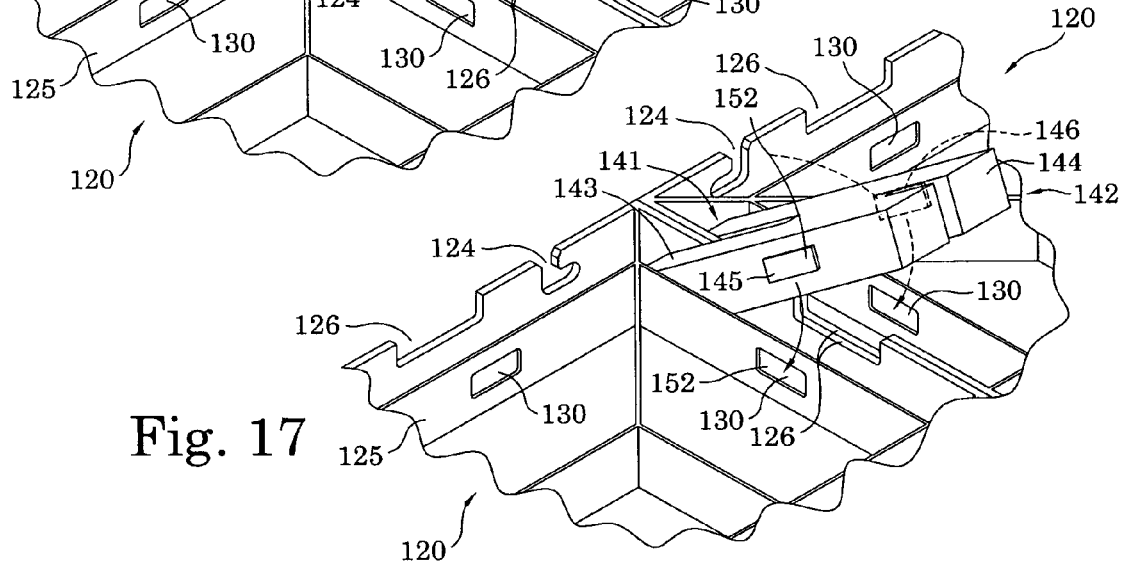
FIG. 17 is a perspective detail view of two adjacent upside-down panels and a connector with its first end engaged with the panels.
Figure 18:
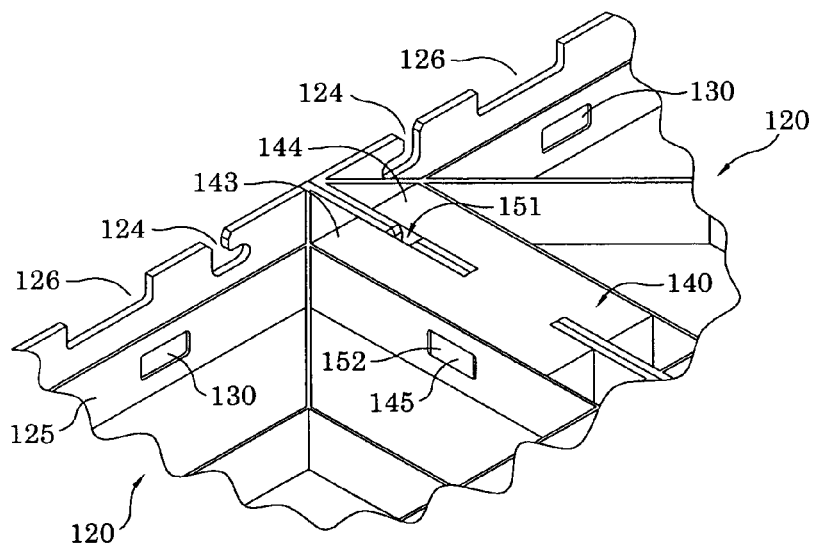
FIG. 18 is a perspective detail view of two adjacent upside-down panels and a connector in fully nested engagement with the panels.

In accordance with a preferred embodiment of the inventions, an assembly apparatus is preferably made by assembling or securing multiple panels 120 to each other in an upside-down orientation. This is illustrated in FIGS. 16-18. More specifically, in accordance with some preferred embodiments of the inventions, the apparatus 101 can be placed in a right-side-up orientation, as shown in FIG. 1, following assembly of the panels while in an upside-down orientation. It is to be understood that the arrangement of the panels shown and described herein are one preferred construction and others may be useful in inventions according hereto. More specifically, it is to be understood that the panels may be arranged in any of a variety of combinations to produce a surface of suitable size and/or shape in accordance with one or more preferred embodiments of the inventions.

Panel or Panels

Panel Top

The panel is preferably designed to be relatively lightweight, durable, and rigid. The panel has a top surface or top side 121. The top surface is preferably approximately flat. In accordance with at least one embodiment of the inventions, the top surface is provided with a level of skid resistance using a texturized surface or ornamental features with edges that may aid in combination with general surface roughness or texturizing. The top surface is constructed and configured to provide the ability to form an array and thus be at least a portion of a deck surface. This may be accomplished using a panel, or more preferably, as an assembly or more than one panels, such as shown in FIG. 1. Although use in an array is the expected preferred assembled configuration, there may be instances where a single panel may be suitable for use.

Panel Bottom Construction

Figure 3:
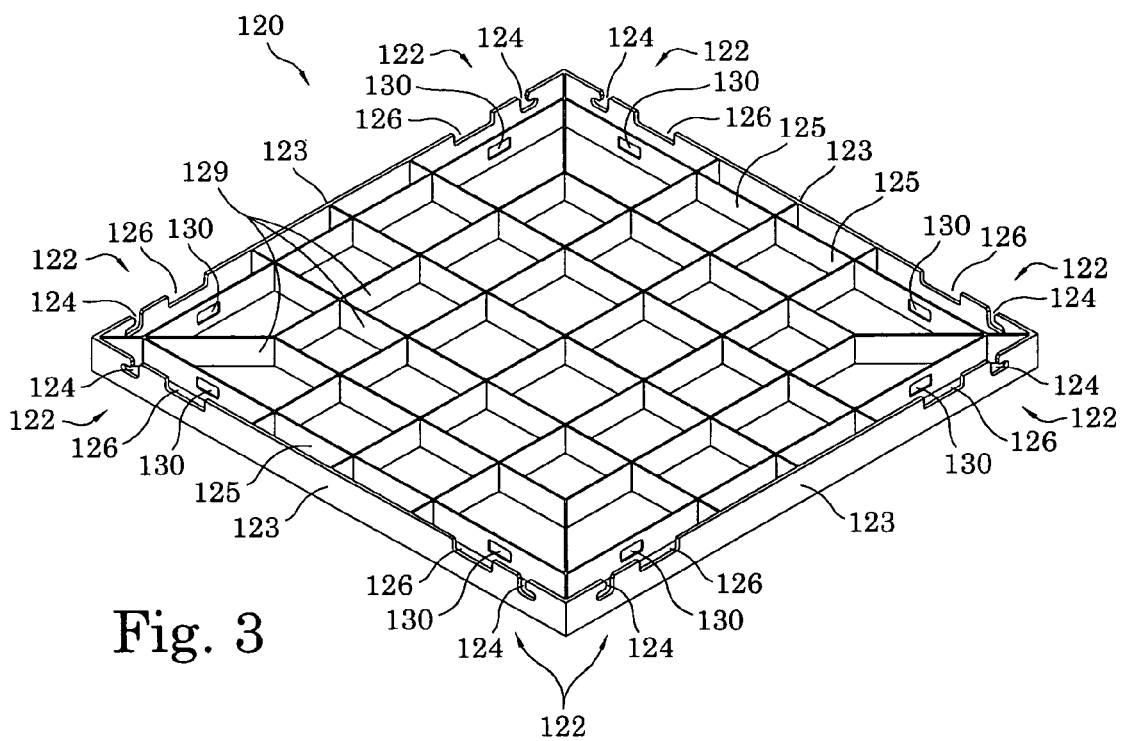
FIG. 3 is a perspective view showing the bottom of the panel of FIG. 2.

FIG. 3 shows in perspective a preferred construction used for the bottom of panels made in accordance with the inventions hereof. The illustrated construction is appropriate because it provides strong and relatively rigid construction and helps reduce the amount of polymer that is used. As shown, the panel bottom has a formation of webs which are molded into the bottom when the piece is preferred formed. As shown, the webs are arranged as a rectilinear formation of webs which intersect. Additionally there are further reinforcements at the corners which webs that are angled to extend out from the rectilinear array to the actual corner of the panel. This is helpful in providing added strength by having the corner webs reinforce the corners which are more susceptible to breakage. The corner webs also preferably extend inward from the peripheral zone at least one spacing to provide added strength. The peripheral zone is provided with edge 123 which is relatively more closely spaced to web 125. In the more preferred versions of the invention the entire panel is integral. This is most efficiently accomplished by molding the entire panel unit as a single unitized part. This allows slight fillets at various node points to counteract stress risers that can occur at joinder points of various webs parts and with regard to connection of the webs to the panel top surface.

Preferred Panel Edge Construction

Figure 2:
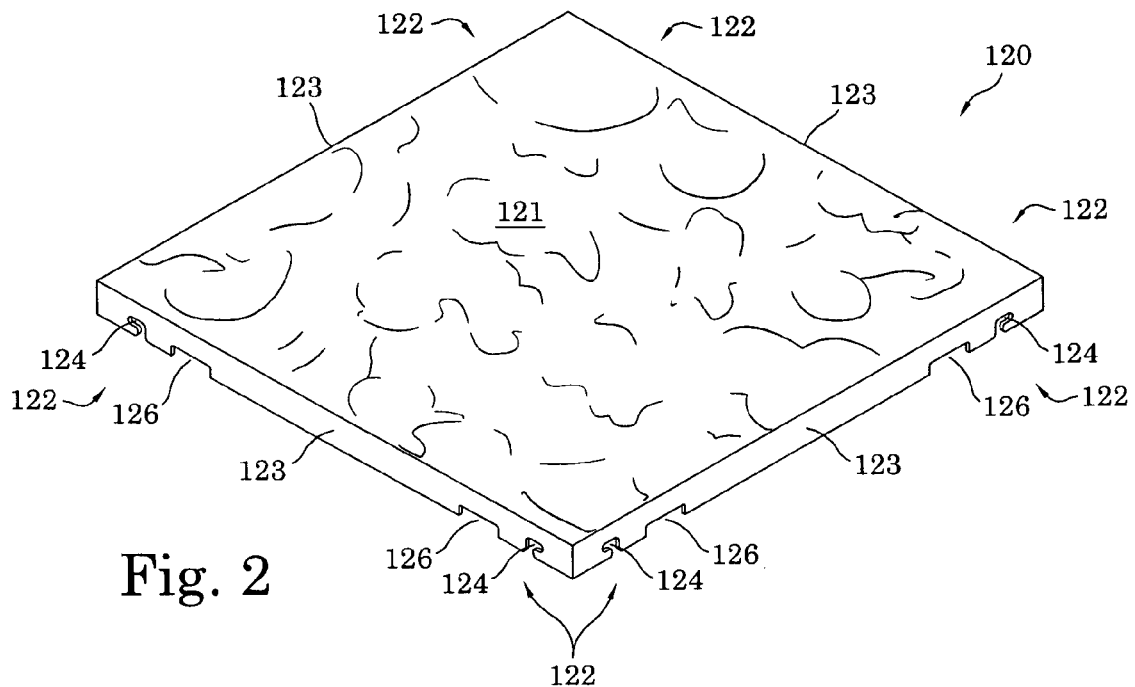
FIG. 2 is a perspective view of a panel used in the assembly of FIG. 1 shown in isolation.

With continued reference to FIGS. 2 and 3, the shape of the top surface 121 is defined by a plurality of perimetric edges 123. More specifically, one or more perimetric edges make up a perimeter of the panel generally and also form the perimeter of the top surface 121. Top surface 121 preferably has a modular shape so that multiple pieces can be joined into different sizes and/or shapes of assembled pads. As shown, the modules preferably have a square shape. Other modular patterns may be suitable, for example hexagonal close pack arrangements may also serve to advantage in some configurations. For reasons apparent from the description herein, the square modular arrangement is more preferred to allow easy attachment of edge and corner pieces.

Referring now to FIGS. 2 and 3, each perimetric edge 123 may advantageously have an outer flange which is downwardly depending where in the typical assembled and used position. In the preferred version shown, the outer flange 123 preferably extends substantially downwardly and preferably approximately perpendicular relative to the top surface 121.

With reference to FIG. 3, a lower perspective view shows the panel 120 in isolation. More specifically, FIG. 3 shows the panel in an upside-down orientation. The panel 120 preferably includes a secondary or inner flange or rib 125. The secondary flange is preferably inwardly offset from, and in substantially parallel juxtaposed relation to, the outer flange 123 as shown. In accordance with a preferred embodiment of the inventions, a trough is formed between the secondary rib or flange or web 125 and the outer flange or web 123. In addition to the inner flanges and outer flanges, the panel preferably includes one or more interior ribs or webs 129 or other such stiffening features. The ribs are advantageously configured to incorporate into the panel a high level of stiffness or rigidity for the amount of polymer or other materials used.

Panel Connection Features

With continued reference to FIGS. 2 and 3, the panel includes one or more features used to facilitate connection of adjacent panels to one another or allow other system parts of the systems to connect in various configuration, for example the connection of the edge pieces 160 for a wide variety of different array shapes and sizes.

The connection features may include one or more connection receptacles 124 and 126 at a connection location. As shown, each panel has two connection locations along each side. Other arrangements are also possible having more or less connection locations.

Although other connection constructions may be employed in the inventions according to this document, a locking connection is preferred. By employing a locking connection then the array is more prone to maintain a connected array configuration and not come loose after assembled for use and after placed in use. The locking connections are also advantageous in that during assembly each panel is securely connected and manipulation to add further panels or other parts is not likely to cause previously attached panels or other components to come loose during the assembly process.

In the preferred construction shown, the connections advantageously use features on the panel and a connection piece or pieces which then join adjacent components. First locking feature 124 and second locking feature 130 make up at least a portion of a lock or locking mechanism that is described in detail further below. The locking features may be defined in the outer flange 123 and/or the inner flange 125. In accordance with the preferred embodiment, the locking features include one or more of a first locking feature 124, and a second locking feature 130. In accordance with the exemplary embodiment of the inventions illustrated herein, the first locking feature 124 is substantially in the form of a slot, while the second locking feature 130 is substantially in the form of an aperture. Although these two forms of locking features are currently preferred, other configurations are believed operable having at least one locking feature to each panel.

Preferably, the slot 124 is defined in the outer flange 123, while the aperture 130 is defined in the inner flange 125. More preferably, each outer flange defines a pair of symmetrically arranged slots, as shown. Likewise, the inner flange preferably defines a pair of symmetrically arranged apertures, as shown. Most preferably, the slots 124 are L-shaped, while the apertures 130 are rectilinear in shape. It is to be understood that the panel locking features, in accordance with alternative embodiments of the inventions, may have suitable forms and configurations other that those specifically depicted and described herein.

With continued reference to FIGS. 2 and 3, the panel 120 may include a notch 126. Preferably, each notch is defined in the outer flange 123. In accordance with the preferred embodiment of the inventions, each outer flange has a pair of notches 126. More preferably, the pair of notches is symmetrically arranged in the outer flange as shown. Still more preferably, each notch is arranged in substantial juxtaposed alignment with a corresponding aperture 130, as is also shown. In accordance with the exemplary embodiment of the inventions, the notch is substantially rectilinear in shape.

Panel Construction and Materials

Referring now to FIG. 2, an upper perspective view shows a panel 120 in isolation. The panel may be formed from a number of suitable materials and may be formed using a variety of suitable forming means. Preferably, the panel is formed from a moldable polymer, such as a thermoplastic material, for example one of a number of moldable polymer materials. For instance, the panel may be formed from polypropylene (PP828-01) or other suitable polymer or other preferably moldable materials. Although molding is preferred, partial or total fabrication may also be possible but such a manner of making appears more expensive at this time. The panel is advantageously formed into the indicated preferred construction using suitable forming means and techniques, such as by injection molding.

Edge Pieces

With reference now to FIGS. 1 and 8-12, the apparatus 101 may include one or more edge pieces 160. Edge pieces are preferred to reduce the risk of tripping and provide enhanced appearance. The edge piece has an outer surface 165. One or more openings 167 may be defined through the outer surface of the edge piece. Preferably, a plurality of oblong openings are defined through the outer surface of the edge piece, as shown. In accordance with at least one embodiment of the inventions, the edge piece is connectible to a corresponding panel 120 to provide a transition at the edge of the panel.

Preferably, the edge piece includes one or more lugs 166. More preferably, the lugs 166 extend from a rear side of the edge piece that is opposite the outer surface 165. Most preferably, each lug defines a tab 168 shown in FIGS. 10-12. The edge piece 160 is substantially elongate as shown. The edge piece extends between a first end 171 and an opposite distal second end 172. Each of the first and second ends may include one or more retention features 162 as shown. The retention features 162 can be employed to retain a corner piece (not shown) as is explained further below.

Figure 8:
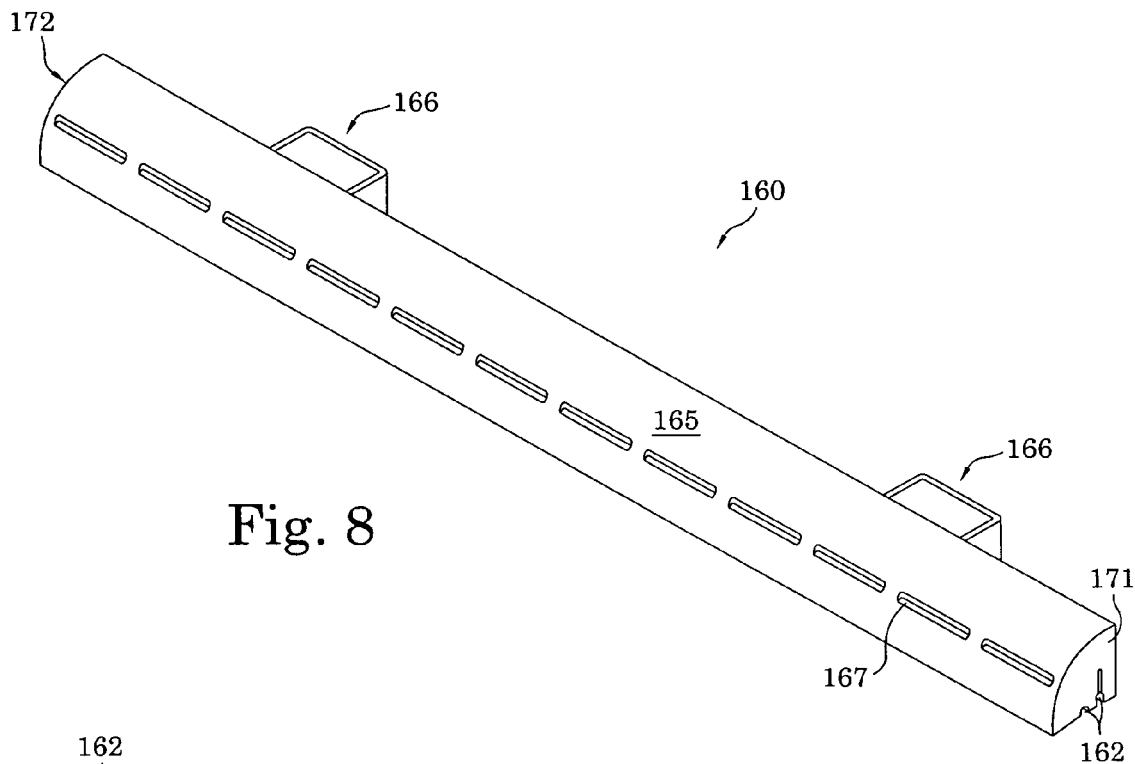
FIG. 8 is a perspective view of an edge piece shown in isolation.
Figure 9:
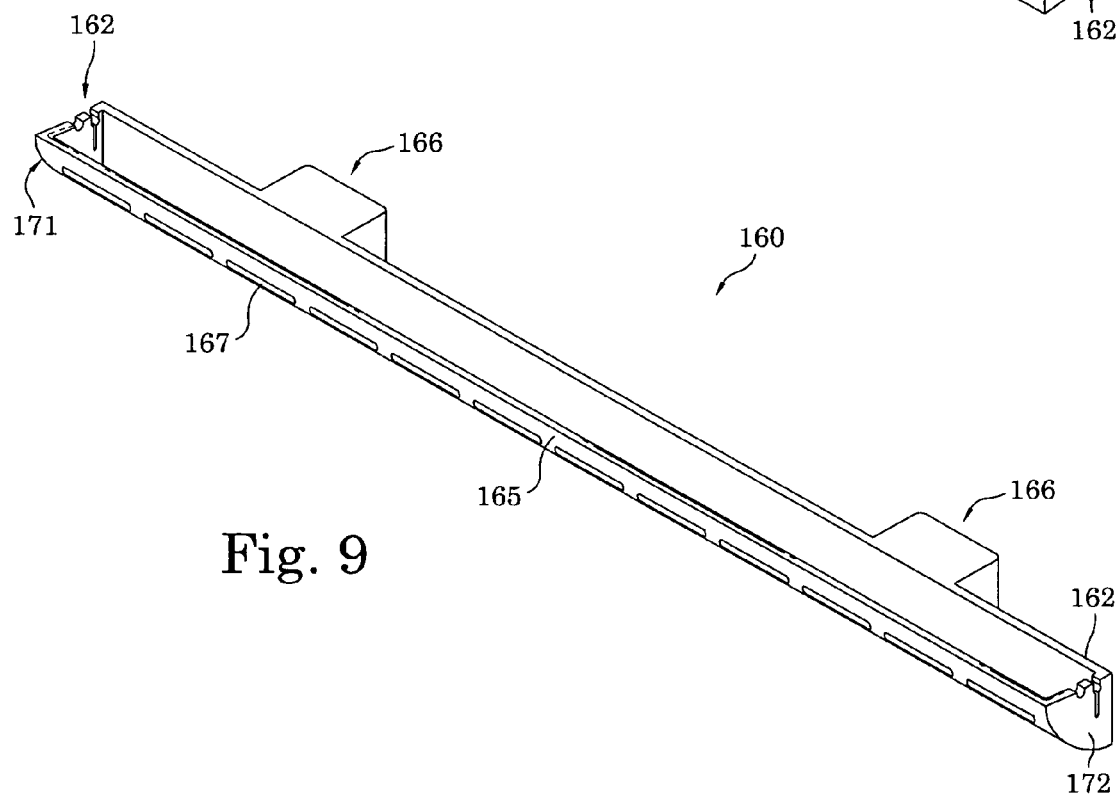
FIG. 9 is a perspective view showing the edge piece of FIG. 8 in an upside-down orientation.

Referring now to FIGS. 1, 2 and 8, the outer surface 165 of the edge piece preferably provides a smooth transition from the top surface 121 of the panel to the base (not shown) upon which the apparatus 101 is supported, when the edge piece is connected with the panel. The outer surface 165 is preferably sloped in some manner to provide such a transition. More preferably, the outer surface has a curved profile or shape. In accordance with the preferred embodiment of the inventions, the outer surface 165 of the edge piece has a substantially round or arcuate profile, as shown. Still more preferably, the edge piece is substantially in the form of a circular cylindrical section. It is to be understood however, that the edge piece 160 may have any other suitable shape or profile in addition to those specifically depicted and described with respect to the exemplary embodiments.

Turning now to FIGS. 19 and 20, the edge piece 160 is connectible to a perimetric edge 123 of a panel 120 by any suitable connection means. In accordance with the exemplary embodiment of the inventions, the edge piece is connectible to the panel by way of the lugs 166. More specifically, the lugs 166 are preferably configured to fit snugly within the through formed between the outer flange 123 and inner flange 125. Most preferably, the lug 166 and tab 168 are configured such that when the lug is substantially fully seated between the inner flange and outer flange, the tab is engaged with a corresponding aperture 130 to retain the edge piece in a desired position relative to the panel. A desired position of the edge piece 160 relative to the panel 120 in accordance with a preferred embodiment of the inventions is shown in FIGS. 1 and 20.

With continued reference to FIGS. 1 and 20, the edge piece preferably has a length dimension that is the same as that of the panel perimetric edge 123 to which the edge piece is connected, as shown. Thus, a corner space or gap may be formed when two edge pieces 160 are connected to adjacent perimetric edges of a panel 120. Such a Gorner space may be filled in with a corner piece 180 as further described below.

Corner Pieces

With reference to FIGS. 1, 13 and 15, the corner piece 180 has an outer surface 185. The outer surface is preferably sloped. More preferably, the outer surface is substantially rounded. More specifically, the outer surface of the corner piece preferably has a curved profile or shape. In accordance with the preferred embodiment of the inventions, the outer surface 185 of the corner piece has a substantially spherical profile, as shown. More preferably, the corner piece is substantially in the form of a spherical section. It is to be understood however, that the corner piece may have any other suitable shape or profile in addition to those specifically depicted and described herein. As shown the corner pieces form approximately one-eighth of a sphere or one-fourth of a hemisphere.

Detail views of the corner piece are shown in FIGS. 13 and 15. The corner piece preferably has two connection faces 186. The corner piece preferably includes one or more connection features 181. The connection features are preferably defined on each of the connection faces 186, as shown. The connection faces are preferably flat and are preferably substantially perpendicular relative to each other, as shown.

As mentioned above, the corner piece 180 is preferably connectible at a corner formed between two adjacent edge pieces 160, as shown in FIG. 1. In accordance with at least one embodiment of the inventions, the corner piece forms a transition between the two adjacent edge pieces. The corner piece is preferably connectible to both adjacent edge pieces. The corner piece may be secured or connected to the adjacent edge pieces by any suitable connection means. With reference to FIGS. 8-14, the corner piece is preferably connectible to two adjacent edge pieces by way of the retention features 162 and connection features 181. More specifically, the retention features of the edge pieces and the connection features of the corner pieces are preferably configured to engage each other to affect retention of the corner piece in a desired position between two adjacent edge pieces. For example, the retention features and connection features may be in the form of correspondingly engaging slots and grooves, as is understood from a study of FIGS. 10-13 and 13-15.

First Embodiment Connector

First Connector for Joining Panels

Now referring to FIGS. 1, 4-7, the apparatus 101 includes at least one connector 140. The connector is adapted to secure at least two panels 120 in adjoined relation, as is explained further below. The connector preferably has a generally bifurcated configuration as is evident from a study of FIGS. 4-7. More specifically, the connector preferably includes a first portion 143 and a second portion 144 arranged in offset or spaced-apart parallel juxtaposed relation to each other. More preferably, the connector 140 includes a first lug 143 joined to a second lug 144 by a central portion 146. The central portion 146 is preferably located between the first and second lugs. The central portion, by being located between the first and second lugs, provides for a space or gap between the first and second lugs, as is seen from a study of the accompanying figures. Thus, in a preferred embodiment of the inventions, the connector 140 is substantially H-shaped.

With continued reference to FIGS. 4-7, the connector 140 has a first end 141 and an opposite second end 142. The connector 140 preferably includes at least one locking feature. For example, the connector 140 may include at least one first locking feature 147. The connector may include at least one second locking feature 145. The connector preferably includes both a first locking feature and a second locking feature. The first locking feature 147 may be located near the first end 141 of the connector. Similarly, the second locking feature 145 may be located near the second end 142 of the connector.

In accordance with one embodiment of the inventions, the connector includes a first locking feature as well as a pair of second locking features 145, as shown. The first locking feature is preferably in the form of a dowel or bar that extends between the first and second portions 143, 144. The second locking features are preferably in the form of a pair of tabs, with one tab being defined on each of the first and second portions, as shown. As is further shown, the bar 147 is preferably cylindrical in shape. The tabs 145 are preferably rectilinear in shape. It is understood that, in accordance with alternative embodiments of the inventions, the locking features may have alternative suitable forms and configurations other than those specifically described and depicted herein.

As mentioned herein above, the connector 140 is configured to secure or connect at least two adjoining panels 120 together to form a surface or decking surface. More preferably, at least two connectors are employed to secure or connect each panel to an adjoining panel. In accordance with preferred embodiments of the inventions, the connector is completely separate and removable from the panels. More specifically, the connectors and the panels are preferably each discrete components of the apparatus.

Lock Mechanisms

Turning now to FIG. 16, a lock mechanism 150 is included in the apparatus shown in FIG. 1. The lock mechanism is configured to retain the connector 140 in secured engagement with two adjoined panels 120. More specifically, the connector is preferably adapted to secure two panels in adjoined relation, while the lock mechanism is adapted to secure the connector in place relative to the panels which are being joined by the connector. More specifically, securement of two panels in adjoined relation is a function of the connector, while securement of the connector in substantially immovable relation to the adjoined panels is a function of the lock mechanism or mechanisms.

With reference now to FIGS. 16-18, the lock mechanism 150 preferably includes a first lock portion 151 and a second lock portion 152. The first lock portion 151 preferably includes the first panel locking features 124 of each adjoined panel 120 as well as the first connector locking feature 147 of the associated connector 140. The second lock portion 152 preferably includes the second panel locking features 130 of each adjoined panel as well as the second connector locking features 145 of the associated connector.

A study of FIGS. 16-18 reveals that the first portion 143 of the connector 140 is preferably adapted to nest between the inner flange and outer flange of one of the adjoined panels. Likewise, the second portion 144 of the connector is preferably adapted to nest between the inner flange and outer flange of another of the adjoined panels. The connector is shown to be in a substantially fully nested or engaged position in FIG. 18. With the connector fully engaged with the panels, as shown, the outer flanges of the adjoining panels are captured between the first portion and second portion of the connector. In this manner, the connector preferably functions to secure the panels in adjoined relation.

With continued reference to FIGS. 16-18, the lock mechanism preferably acts to secure the connector in the fully engaged position with the adjoined panels. In accordance with a preferred embodiment of the inventions, the connector is placed into a secured position by engaging the first end of the connector with the two adjoined panels as is seen by a study of FIGS. 16, 17, and then swinging the second end of the connector into a locked position as is seen by a study of FIGS. 17, 18. More specifically, the lock mechanism 150 is employed to secure the connector 140 to the adjoined panels 120 by employing the first lock portion 151 to retain the first end 141 of the connector to the panels as shown in FIGS. 16, 17, and then employing the second lock portion 152 to retain the second end 142 of the connector to the panels as shown in FIGS. 17, 18.

In accordance with a preferred embodiment of the present invention, two panels 120 are secured in adjoined relation by first positioning the two panels in an upside down orientation as shown in FIGS. 16-18. The two panels are then placed side-by-side so that an outer flange of one panel is in adjacent juxtaposed relation to an outer flange of the other panel. Additionally, the panels are positioned so that the slots 124 and notches 126 of each panel are substantially aligned as shown.

After positioning of the panels 120 is accomplished as described above, the first end 141 of the connector 140 is secured to the panels by manipulating the connector to engage the bar 147 with the slots 124 in the panels as is understood from a study of FIGS. 16 and 17. In accordance with the exemplary embodiment of the inventions, such engagement of the bar with the slots requires that the connector be tilted relative to the panels as shown in FIG. 17. More specifically, engagement of the first end of the connector with the panels preferably requires that the first end of the connector be tilted toward the panels and that the second end be tilted away from the panels.

Following the engagement of the bar 147 with the slots 124 as described above, the second end of the connector is preferably swung or pivoted toward the panels as understood from a study of FIGS. 17 and 18. As the second end of the connector is swung into position, engagement of the second lock portion 152 is accomplished in accordance with a preferred embodiment of the inventions. More specifically, the bar 147 is preferably first engaged with the slots, and then the connector is swung substantially about the bar toward the panels until a catch 130, 145 is engaged. In accordance with a preferred embodiment of the inventions, the catch is in the form of tabs 145 adapted to be substantially captured within the respective apertures 130 when the connector is swung into position against the panels, as shown by FIGS. 17, 18.

Second Embodiment Connector

Connector for Joining Panels in a Folding Hinge Configuration

With reference to FIGS. 21-24, a foldable connector 240 in accordance with an alternative preferred embodiment is shown. The foldable connector may be employed to join-two or more panels 220 to form the foldable assembly 201 shown in FIG. 25. The foldable connector 240 may be substantially similar to the rigid connector 140 described herein above with respect to FIGS. 4-7 and 16-18, except that the foldable connector 240 shown in FIGS. 21-24 includes a joint 249. The foldable connector is preferably adapted to be employed to secure two panels 120 in adjoined relation in a manner substantially similar to that described above with respect to the rigid connector 140. However, the joint 249 of the foldable connector 240 is adapted to allow the assembled panel apparatus 201 to be folded as shown in FIG. 25. More specifically, in accordance with one embodiment of the inventions, the joint is configured to allow two adjacent panels to be folded relative to each other.

With reference to FIGS. 21-24, the joint 249 is of a configuration suitable to enable folding of the apparatus 201 as shown. For example, in accordance with the exemplary embodiment of the inventions, the joint 249 is in the form of a thinned section of the connector 240. However, it is to be understood that the joint may have alternative suitable configurations not specifically shown or described herein. For example, in accordance with an alternative embodiment of the inventions not shown, the joint 249 includes and/or is substantially in the form of a hinge.

The connector 240 is preferably formed from molded thermoplastic in accordance with one preferred embodiment of the inventions. Accordingly, the joint 249 is preferably a narrow, elongated section of thinned and/or flexible thermoplastic. More preferably, the joint 249 is an integral portion of the connector, being formed of the same material from which the connector is formed. The joint is preferably dimensioned and/or otherwise configured to provide a suitable balance of flexibility, strength and durability. The joint 249 is preferably symmetrically located between the first portion 243 and second portion 244 of the connector, as shown.

A further difference between the rigid connector 140 and the alternative foldable connector 240, is that the former preferably includes a continuous bar 147 that extends between the first portion 143 and second portion 144, while the latter does not include such a bar. Instead, the foldable connector 240 preferably includes a pair of dowels or pins 247, 248 located so as to be in substantially coaxial alignment with each other when the connector is not folded, as shown in FIGS. 21-24. Each of the dowels or pins 247, 248 is preferably adapted to engage a respective slot 122 in the manner described above with respect to the engagement of the bar 147 with the slots, as shown in FIGS. 16-18. More specifically, the foldable connector 240 is preferably adapted for engagement with two adjoined panels 120 in a manner substantially similar to that described herein above with respect to the engagement of the connector 140 as shown in FIGS. 16-18.

Methods of Assembly

A preferred embodiment of the inventions includes a method of forming an assembly. For example, an assembly formed according to the method may be the assembly 101 shown in FIG. 1, or the assembly 201 shown in FIG. 25. The method includes placing two panels into adjoined proximity. The panels used in the method may be, for example, the panel 120 shown in FIGS. 2 and 3. The method also includes manipulating a connector to engage the first end of the connector with the two adjoined panels, and then swinging a second end of the connector into a locked position as shown, for example, in FIGS. 16-18. The connector used in the method may be, for example, the connector 140 shown in FIGS. 4-7. Alternatively, the connector used in the method may be, for example, the foldable connector 240 shown in FIGS. 21-24.

The method preferably includes placing a bar defined on the first end of the connector into a slot defined on each of the two adjoined panels. The bar may be, for example, the bar 147, which is included in the connector 140. Alternatively, the method preferably includes placing each of a pair of dowels defined on the first end of the connector into a corresponding slot defined on each of the two adjoined panels. The pair of dowels may be, for example, the pair of dowels 247, 248 defined on the connector 240. The slot is preferably L-shaped as shown in FIGS. 2, 3 and 16-18. Swinging the second end of the connector into a locked position preferably includes swinging or pivoting the connector about the bar. Alternatively, the process of swinging the second end of the connector into a locked position includes swinging or pivoting the connector about the pair of dowels or pins.

Manners of Using First Embodiment

The first embodiment may be used to for various sizes and shapes of deck areas. The individual panels are joined using the connectors which preferably lock into position and have the benefit of the leverage of the connection piece to help the user to rotate about the pivot 147 until the locking extensions 152 fit into their intended receptacles 130. Thus each connector has two points of connection with each of the adjacent panels being joined.

The user has the benefit of not having to exercise a great deal of care because the connectors have the rods 147 which are seated in a self-aligning position as the user pushes onto the connector and gains a leverage advantage that both forces the pins fully into the L-shaped receptacles and the locking extensions snap into their respective receiving features 130.

The apparatus can then easily be paced into an upright condition and the edge pieces and corner pieces installed as desired and explained herein above.

Manners of Using Second Embodiment

One or more aspects and/or features of the inventions described herein may be used jointly or individually in connection with assemblies. In particular, the configuration of the panels 120, connectors 140, 240 and lock mechanism 150 enable any edge 123 of any first panel to be adjoined in secured relation to any edge of a second panel. The configuration of the connectors 140, 240 and lock mechanism 150 provide for secure adjoining of two panels using a relatively low number of connectors. For example, in accordance with a preferred embodiment of the inventions, a panel having a nominal size of two feet by two feet may be securely joined with another panel of that size using only two connectors. This provides benefits of enabling quick and simple assembly of the apparatus, while also providing secure adjoining of the panels.

The foldable configuration of the connector 240 enables two adjoined panels to be folded relative to each other, as shown in FIG. 25. This enables the deck array to be maintained in assembled or substantially assembled condition and merely be folded along a centerline and slid into a pickup or car without having to fully assemble and disassembly the deck array each time it is used. This has very significant convenience to the user.

This ability to be folded reduces the size of the apparatus 201 to be compacted without disassembly of the apparatus. This provides a convenience benefit to the user of the apparatus because the size of the apparatus may be easily reduced or compacted for storage and/or transport.

By suitable configuring the use of hinged connectors a zig-zag assembly of folded panels may be formed and conveniently used.

Manners of Making

Various portions and components of apparatuses within the scope of the inventions, including for example, structural components, may be formed by one or more various suitable manufacturing processes known to those in the arts of thermoplastics and injection molding of thermoplastics. Similarly, various portions and components of apparatuses within the scope of the inventions can be made from suitable materials known to those in the arts of thermoplastics and injection molding of thermoplastics. It is to be understood, however, that various portions and components of apparatuses within the scope of the inventions may be formed by one or more various suitable manufacturing processes known to those in arts other than those specifically mentioned herein, and/or by one or more processes or means not yet known but hereafter developed.

Interpretation Notes

The above description has set out various features, functions, methods and other aspects of the inventions. This has been done with regard to the currently preferred embodiments thereof. Time and further development may change the manner in which the various aspects are implemented. Such aspects may further be added to by the language of the claims which are incorporated by reference hereinto as originally filed.

The scope of protection accorded the inventions as defined by the claims is not intended to be necessarily limited to the specific sizes, shapes, features or other aspects of the currently preferred embodiments shown and described. The claimed inventions may be implemented or embodied in other forms while still being within the concepts shown, described and claimed herein. Also included are equivalents of the inventions which can be made without departing from the scope of concepts properly protected hereby.

I claim:

1. An apparatus forming a modular decking assembly comprising:
    at least two panels, each panel of single piece construction with a generally planar top surface, strengthening webbing on an underside of the top surface defining a panel thickness, and a plurality of perimetric edges, each perimetric edge having a structurally connected downwardly extending outer flange perpendicular to the top surface extending the thickness of the panel and an inner flange structurally connected to and extending from the underside of the top surface spacedly inward of and parallel to the outer flange defining a trough between the outer flange and the inner flange, said at least two panels being adapted for joinder along the outer flanges thereof;
    at least one connector adapted to secure said at least two panels in adjoined relation so that the outer flange of one panel is immediately adjacent the outer flange of a second panel, the at least one connector having a first end portion adapted for simultaneous engagement with the two adjoined panels and a distal second end portion adapted to be swung into a locked position in the trough;

a lock mechanism adapted to secure the at least one connector to the at least two adjoined panels, the lock mechanism including a first lock portion defined in the outer flange of each panel adapted to retain the first end portion of the at least one connector to said at least two adjoined panels in pivotal relation to both panels and a second lock portion adapted to retain the second end portion of the at least one connector to said at least two adjoined panels, the second lock portion defined in the at least two panels.

2. An apparatus according to claim 1, wherein the first lock portion includes a slot defined in the outer flange of said at least two panels.

3. An apparatus according to claim 1, wherein the first lock portion includes an L-shaped slot defined in the outer flange of said at least two panels.

4. An apparatus according to claim 1, wherein the first lock portion includes:
a slot defined in the outer flange of said at least two panels;
a bar defined on said at least one connector and adapted to simultaneously fit within the slots of said at least two panels.

5. An apparatus according to claim 1, wherein the first lock portion includes:
an L-shaped slot defined in the outer flange of said at least two panels;
a bar defined on said at least one connector and adapted to simultaneously fit within the L-shaped slots of the at least two panels.

6. An apparatus according to claim 1, wherein the second lock portion includes a catch.

7. An apparatus according to claim 1, wherein:
the first lock portion includes a slot defined in said at least two panels;
the first lock portion further includes a bar defined on said at least one connector and adapted to fit within the slots of the at least two panels; and
the second lock portion includes a catch.

8. An apparatus according to claim 1, wherein the connector is a foldable connector.

9. An apparatus according to claim 1, wherein the connector includes a joint.

10. An apparatus according to claim 1, wherein the connector is adapted to enable the adjoined panels to be folded relative to each other.

11. An apparatus according to claim 1 further comprising:
edge pieces that releasably engage with an outer flange of the at least two panels to form a transition between a supporting surface and the generally planar top surface.

12. An apparatus according to claim 11 further comprising:
plural corner pieces that releasably engage with end portions of the edge pieces.

13. A method of forming a modular decking assembly, comprising:
placing at least two panels into adjoined proximity in an upside down orientation with an outer flange of a first panel immediately adjacent an outer flange of a second panel;
manipulating at least one connector to simultaneously engage a first end portion thereof with the outer flanges of the two adjoined panels;
swinging a second end portion of the at least one connector into a locked position; wherein manipulating the at least one connector to engage the first end portion includes placing a bar defined on the first end portion simultaneously into slots defined in the outer flanges of the at least two panels.

14. A method according to claim 13, wherein: manipulating the at least one connector to engage the first end includes placing a bar defined on the first end portion simultaneously into slots defined in the outer flanges of the at least two panels; and swinging the second end of the at least one connector includes swinging the connector about the bar.

15. A method according to claim 13, wherein:
the connector is a foldable connector; and
the method further comprising folding the two adjoined panels relative to each other.

16. The method according to claim 13, wherein:
manipulating the at least one connector to engage the first end portion includes placing a bar defined on the first end portion simultaneously into an L-shaped slot defined in the outer flanges of the at least two panels; and
swinging the second end of the at least one connector includes swinging the connector about the bar.

* * * * *